US011914396B2

United States Patent
Higashide et al.

(10) Patent No.: US 11,914,396 B2
(45) Date of Patent: Feb. 27, 2024

(54) OPERATION MANAGEMENT APPARATUS AND OPERATION MANAGEMENT METHOD OF AUTONOMOUS TRAVEL VEHICLE

(71) Applicants: TOYOTA JIDOSHA KABUSHIKI KAISHA, Toyota (JP); DENSO CORPORATION, Kariya (JP)

(72) Inventors: Hiroshi Higashide, Toyota (JP); Kenji Okazaki, Toyota (JP); Keiichi Uno, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 250 days.

(21) Appl. No.: 17/193,760

(22) Filed: Mar. 5, 2021

(65) Prior Publication Data
US 2021/0311495 A1    Oct. 7, 2021

(30) Foreign Application Priority Data
Apr. 2, 2020    (JP) ................. 2020-066703

(51) Int. Cl.
G06Q 10/0631    (2023.01)
G07C 5/02    (2006.01)
G05D 1/02    (2020.01)
G05D 1/00    (2006.01)

(52) U.S. Cl.
CPC ......... *G05D 1/0287* (2013.01); *G05D 1/0223* (2013.01); *G06Q 10/06311* (2013.01); *G07C 5/02* (2013.01)

(58) Field of Classification Search
CPC ............... G05D 1/0287; G05D 1/0223; G06Q 10/06311; G07C 5/02
See application file for complete search history.

(56) References Cited

U.S. PATENT DOCUMENTS

2020/0301442 A1*    9/2020    Umeda ................ G05D 1/0287

FOREIGN PATENT DOCUMENTS

| CN | 107481512 A | 12/2017 |
|----|-------------|---------|
| CN | 109300326 A | 2/2019 |
| JP | 2000-264210 A | 9/2000 |
| JP | 2002-205648 A | 7/2002 |
| WO | 2015/075812 A1 | 5/2015 |

OTHER PUBLICATIONS

Machine Translation of Miura et al. (JP 2000264210 A), 1-17 (Year: 2022).*
Machine Translation of Zhang et al. (CN109300326A), 1-8 (Year: 2022).*
Machine Translation of Hu et al. (CN107481512A), 1-11 (Year: 2022).*

* cited by examiner

*Primary Examiner* — Anne Marie Antonucci
*Assistant Examiner* — Jared C Bean
(74) *Attorney, Agent, or Firm* — Oliff PLC (57) ABSTRACT

When a non-operable notification is output from any of a plurality of operating vehicles, an operation schedule creator creates a substitute vehicle introduction operation schedule based on planned stopping times and a target velocity determined by a normal operation schedule, as an operation schedule to be provided, to each of operating vehicles other than a non-operable vehicle which has output the non-operable notification, when the operating vehicle passes an operation schedule updating location for a first time after the non-operable notification is output.

5 Claims, 10 Drawing Sheets

OPERATION MANAGEMENT APPARATUS AND OPERATION MANAGEMENT METHOD OF AUTONOMOUS TRAVEL VEHICLE

CROSS REFERENCE TO RELATED APPLICATION

This application claims priority to Japanese Patent Application No. 2020-066703 filed on Apr. 2, 2020, which is incorporated herein by reference in its entirety including the specification, claims, drawings, and abstract.

TECHNICAL FIELD

The present disclosure relates to an operation management apparatus and an operation management method for an autonomous travel vehicle, for managing operations of a plurality of vehicles which autonomously travel on a circuit on which a plurality of stops are provided.

BACKGROUND

In recent years, transportation systems which use a vehicle capable of autonomous travel have been proposed. For example, JP 2000-264210 A discloses a vehicle transportation system which uses a vehicle which can travel autonomously along a dedicated path. This vehicle transportation system comprises a plurality of vehicles which travel along the dedicated path, and a supervision and control system which enables operations of the plurality of vehicles. The supervision and control system transmits a departure command and a course command to the vehicle according to an operation plan. The supervision and control system also increases or decreases the number of vehicles according to a boarding demand_(boarding request).

In these systems, there may be cases in which a vehicle which is currently traveling becomes non-operable due to failure or the like. JP 2000-264210 A does not sufficiently investigate adjustment of an operation configuration at the time of occurrence of such a non-operable vehicle.

The present disclosure provides an operation management apparatus and an operation management method for autonomous travel vehicles which enables adjustment of an operation configuration upon occurrence of a non-operable vehicle, to consequently improve convenience of the transportation system.

SUMMARY

According to one aspect of the present disclosure, there is provided an operation management apparatus of a plurality of autonomous travel vehicles which autonomously travel on a circuit. The operation management apparatus comprises an operation schedule creator and an operation schedule provider. The operation schedule creator creates an operation schedule for each of a plurality of operating vehicles which are autonomously traveling on the circuit. The operation schedule provider provides the operation schedule of one lap for each of the operating vehicles when the operating vehicle passes an operation schedule updating location provided on the circuit. The operation schedule creator creates, as the operation schedule, a normal operation schedule in which a stopping time at a stop provided along the circuit and a target velocity of each of the operating vehicles are determined so that operation intervals of the plurality of operating vehicles are an equal interval to each other. When a non-operable notification is output from any of the plurality of operating vehicles, the operation schedule creator creates a substitute vehicle introduction operation schedule based on the stopping time and the target velocity determined by the normal operation schedule, as an operating schedule to be provided to each of the operating vehicles other than a non-operable vehicle which has output the non-operable notification, when the operating vehicle passes the operation schedule updating location for a first time after the non-operable notification is output.

With the above-described structure, after appearance of the non-operable vehicle, the operation schedule is determined based on the stopping time and the target velocity determined by the normal operation schedule. In this process, an operation interval of operating vehicles immediately preceding and following the non-operable vehicle becomes twice the operation interval of the other operating vehicles. That is, the operating vehicles travel one lap of the circuit in a state in which the operation interval between the operating vehicles directly preceding and directly following the non-operable vehicle being available for a substitute vehicle. By securing a state in which the operation interval for the substitute vehicle is enlarged for one lap of the circuit, it becomes possible to safely introduce the substitute vehicle to the circuit.

According to another aspect of the present disclosure, the operation management apparatus may further comprise a vehicle information acquisition unit that receives vehicle information from the plurality of operating vehicles and from an inactive vehicle which is the autonomous travel vehicle for which an operation is suspended, and an introduction controller that controls an introduction timing of the autonomous travel vehicle to the circuit. When the vehicle information acquisition unit receives the non-operable notification, the vehicle information acquisition unit judges whether or not the inactive vehicle can be chosen as a substitute vehicle which can be introduced to the circuit. When the vehicle information acquisition unit judges that the substitute vehicle can be chosen, the introduction controller causes the substitute vehicle to be introduced between an operating vehicle which is the vehicle immediately preceding the non-operable vehicle and an operating vehicle which is the vehicle immediately following the non-operable vehicle, while the plurality of operating vehicles are traveling on the circuit based on the substitute vehicle introduction operation schedule.

According to the above-described structure, the timing of the substitute vehicle introduction can be reliably determined by the introduction controller.

According to another aspect of the present disclosure, in the above-described configuration, when the vehicle information acquisition unit judges that the substitute vehicle cannot be chosen, the operation schedule creator may create, as an operation schedule to be provided next after the substitute vehicle introduction operation schedule, an advancement operation schedule in which the operating vehicle immediately preceding the non-operable vehicle is set as a leading vehicle, and the operation schedule of each of the operating vehicles which follow the leading vehicle is advanced from the normal operation schedule.

When no substitute vehicle is available, the operation schedules of the vehicles which are currently operating can be advanced, so that the operating vehicles are operated with equal intervals.

According to another aspect of the present disclosure, there is provided an operation management method of a plurality of autonomous travel vehicles which autonomously travel on a circuit. In the operation management method, an operation schedule is created for each of a plurality of operating vehicles which are autonomously traveling on the circuit. The operation schedule of one lap for each of the operating vehicles is provided when the operating vehicle passes an operation schedule updating location provided on the circuit. A normal operation schedule is created as the operation schedule, in which a stopping time at a stop provided along the circuit and a target velocity of each of the operating vehicles are determined so that operation intervals of the plurality of operating vehicles are an equal interval to each other. When a non-operable notification is output from any of the plurality of operating vehicles, a substitute vehicle introduction operation schedule is created based on the stopping time and the target velocity determined by the normal operation schedule, as the operation schedule to be provided to each of the operating vehicles other than a non-operable vehicle which has output the non-operable notification, when the operable vehicle passes the operation schedule updating location for a first time after the non-operable notification is output.

According to another aspect of the present disclosure, in the above-described configuration, vehicle information may be received from the plurality of operating vehicles and an inactive vehicle which is the autonomous travel vehicle for which an operation is suspended. In this case, when the non-operable notification is received, it is judged whether or not a substitute vehicle which can be introduced to the circuit can be chosen from the inactive vehicle. When it is judged that the substitute vehicle can be chosen, the substitute vehicle is introduced between an operating vehicle which is the vehicle immediately preceding the non-operable vehicle and an operating vehicle which is the vehicle immediately following the non-operable vehicle, while the plurality of operating vehicles are traveling on the circuit based on the substitute vehicle introduction operation schedule.

According to another aspect of the present disclosure, in the above-described configuration, when it is judged that the substitute vehicle cannot be chosen, an advancement operation schedule may be created as an operation schedule to be provided next after the substitute vehicle introduction operation schedule, in which an operating vehicle which is immediately preceding the non-operable vehicle is set as a leading vehicle, and the operation schedule of each of the operating vehicles which follow the leading vehicle is advanced from the normal operation schedule.

According to various aspects of the present disclosure, the operation configuration can be adjusted in the event of occurrence of a non-operable vehicle, thus improving convenience of the transportation system.

BRIEF DESCRIPTION OF DRAWINGS

Embodiments of the present disclosure will be described based on the following figures, wherein.

DESCRIPTION OF EMBODIMENTS

Figure 1:
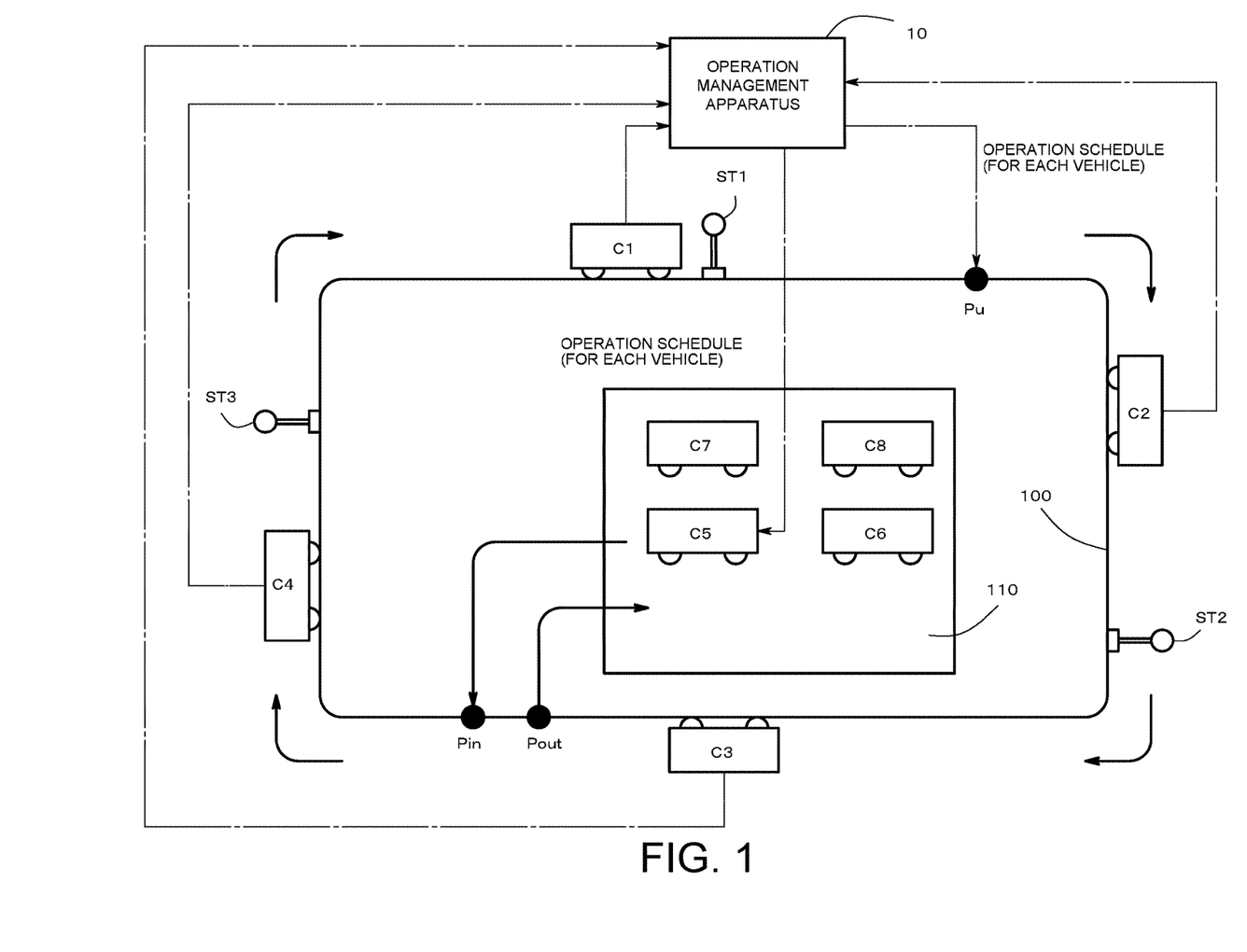
FIG. 1 is a schematic diagram of a transportation system on which an operation management apparatus according to an embodiment of the present disclosure is provided.

FIG. 1 is a schematic diagram which exemplifies a transportation system including an operation management apparatus 10 according to an embodiment of the present disclosure. The transportation system includes, in addition to the operation management apparatus 10, operating vehicles C1~C4, inactive vehicles C5~C8, and stops ST1~ST3.

In the following description, when the plurality of vehicles C1~C8 are not to be distinguished, the index for distinguishing the vehicles may be omitted, and the vehicle may be simply described as □v vehicle C□. Similarly, when the plurality of stops ST~ ST3 do not need to be distinguished, the stop may be simply described as □s stop ST□.

In the transportation system exemplified in FIG. 1, the vehicle C travels along a circuit 100 which is predefined, and an unspecified large number of users are transported. The vehicle C circulatory operates in a one-way travel on the circuit 100, as shown by an arrow in the figure, and stops at stops ST1~ST3 provided along the circuit 100.

The circuit 100 may be a dedicated road, for example, on which only the vehicles C are allowed to travel. When the vehicle C is a railroad vehicle, the circuit 100 may be a circulating line. Alternatively, the circuit 100 may be a road segment which is set on a normal road on which vehicles other than the vehicles C can travel.

In addition, a shed 110 is provided on the transportation system, connected to the circuit 100. In FIG. 1, inactive vehicles C5~C8 waiting in the shed 110 are exemplified. As will be described later, when a non-operable vehicle occurs among the operating vehicles C1~C4, a substitute vehicle is selected from the inactive vehicles C5~C8 and is introduced to the circuit 100.

As connection points with the shed 110, a retrieval point Pout and an introduction point Pin are provided on the circuit 100. In the example configuration of FIG. 1, the retrieval point Pout and the introduction point Pin are provided between the stops ST2 and ST3.

The operating vehicles C1~C4 traveling on the circuit 100 enter the shed 110 at the retrieval point Pout. The inactive vehicles C5~C8 waiting in the shed 110 are introduced into the circuit 100 from the introduction point Pin. In order to avoid crossover between a vehicle C to be retrieved and a vehicle C to be introduced, the retrieval point Pout is provided upstream of the introduction point Pin.

Further, an operation schedule updating point Pu operation schedule updating location) is provided on the circuit 100, for sending an operation schedule of each vehicle to each of the operating vehicles C1~C4. At the operation schedule updating point Pu, an operation schedule for one lap starting from the operation schedule updating point Pu is provided from the operation management apparatus 10 to the vehicle C passing the point. In this manner, in the vehicle C, the operation schedule is changed every time the vehicle C passes the schedule updating point Pu (that is, for each lap). Details of a method of providing the operation schedule will be described later.

Structure of Vehicle

The vehicle C is a vehicle which can autonomously travel on the circuit 100, and functions as, for example, a shared vehicle which transports an unspecified number of users from a predetermined stop ST to another stop ST. The vehicle C may be, for example, an autobus.

Figure 2:
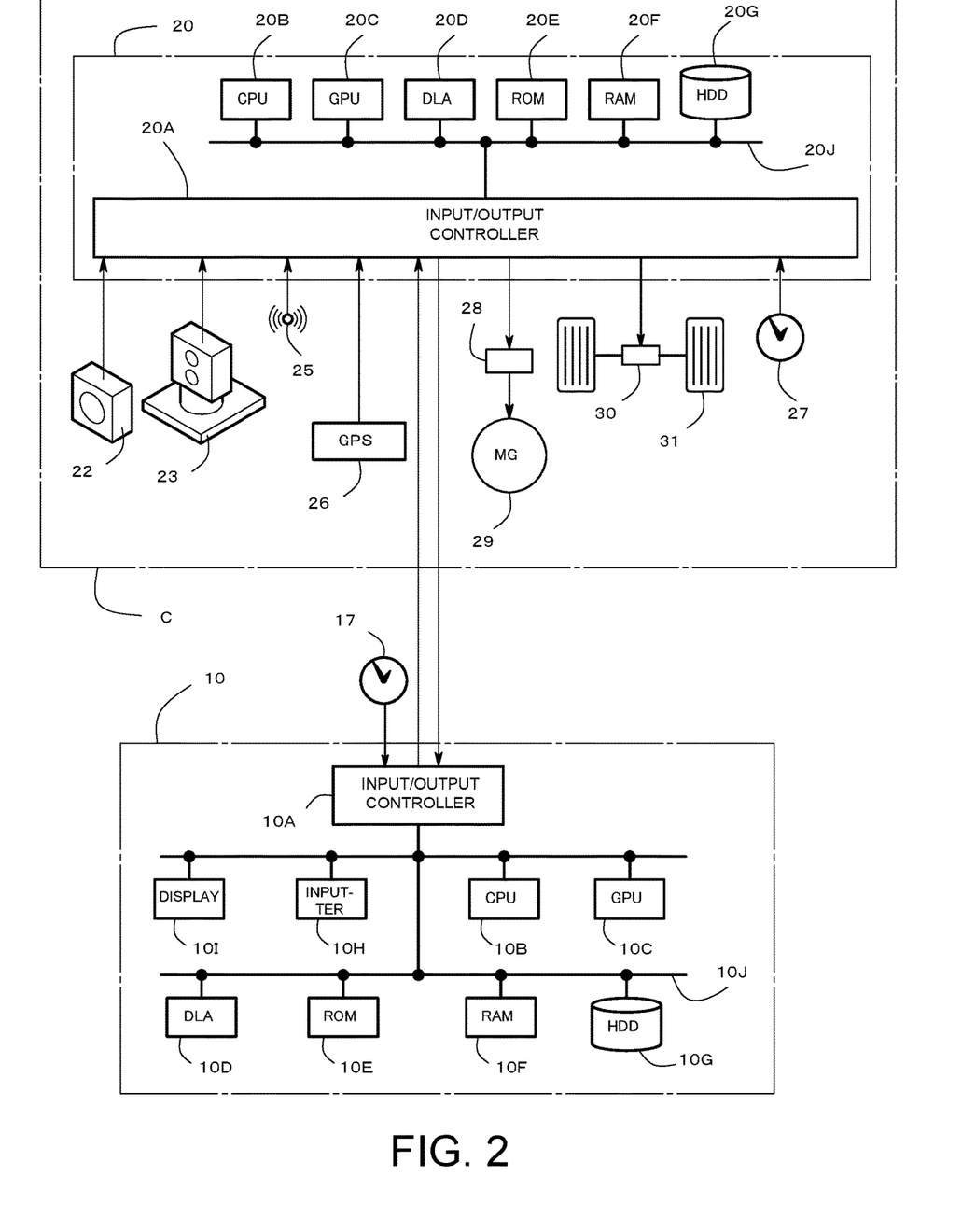
FIG. 2 is a hardware structure diagram of an operation management apparatus and an autonomous travel vehicle.
Figure 3:
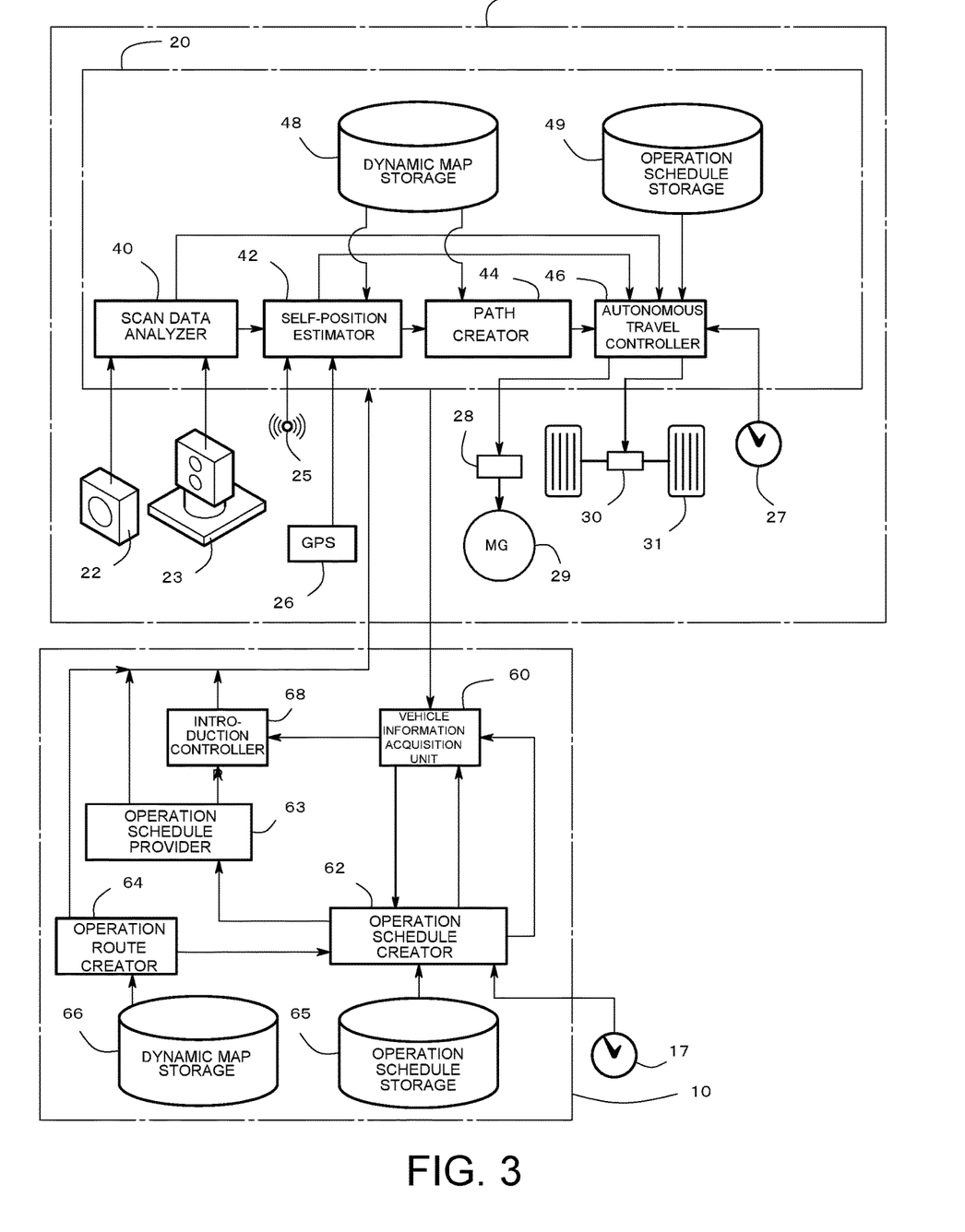
FIG. 3 is a functional block diagram of an operation management apparatus and an autonomous travel vehicle.

FIG. 2 exemplifies a hardware structure of the vehicle C and the operation management apparatus 10. FIG. 3 exemplifies functional blocks of the vehicle C and the operation management apparatus 10 in a mixed state with the hardware. As exemplified in FIGS. 2 and 3, the vehicle C is an electricity-driven vehicle which has a rotary electric machine 29 (motor) as a drive source, and a battery (not shown) as a power supply. The vehicle C can communicate with, that is, exchange data with, the operation management apparatus 10 via a wireless communication.

The vehicle C is equipped with various mechanisms for enabling the autonomous travel. Specifically, the vehicle C includes a controller 20, a camera 22, a lidar unit 23, a proximity sensor 25, a GPS receiver 26, a clock 27, a drive mechanism 28, and a steering mechanism 30.

The camera 22 images a field of view which is approximately identical to that of the lidar unit 23. The camera 22 has an image sensor such as, for example, a CMOS sensor, a CCD sensor, or the like. An image captured by the camera 22 (captured image) is used for the autonomous travel control, as will be described below.

The lidar unit 23 (LIDAR Unit) is a sensor for autonomous travel, and is, for example, a distance measurement sensor which uses infrared. For example, infrared laser light beams are scanned from the lidar unit 23 in a horizontal direction and in a vertical direction, so that three-dimensional point group data can be obtained in which distance measurement data for a peripheral environment of the vehicle C are three-dimensionally arranged. The camera 22 and the lidar unit 23 are provided as a collective sensor unit, for example, on four surfaces including a front surface of the vehicle C, a rear surface, and respective side surfaces connecting the front surface and the rear surface.

The proximity sensor 25 is, for example, a sonar sensor, and detects, for example, a distance between a curb which is a boundary between the roadway and the walkway and the vehicle C, when the vehicle C stops at the stop ST. This detection enables stopping with the vehicle C pulled over near the curb, a process commonly known as precise docking. The proximity sensor 25 is provided, for example, on respective side surfaces and on corners of the front surface and the side surfaces of the vehicle C.

The GPS receiver 26 receives a position measurement signal from a GPS satellite. For example, with the reception of the position measurement signal, a current position (latitude and longitude) of the vehicle C is determined.

The controller 20 may be, for example, an electrical control unit (ECU) of the vehicle C formed from a computer. The controller 20 exemplified in FIG. 2 includes an input/output controller 20A which controls input and output of data. In addition, the controller 20 includes, as a computing element, a CPU 20B, a GPU 20C (Graphics Processing Unit), and a DLA 20D (Deep Learning Accelerators). Further, the controller 20 includes, as storage units, a ROM 20E, a RAM 20F, and a hard disk drive 20G (HDD). These constituting components are connected to an internal bus 20J.

FIG. 3 exemplifies functional blocks of the controller 20. The functional blocks include a scan data analyzer 40, a self-position estimator 42, a path creator 44, and an autonomous travel controller 46. Moreover, the controller 20 includes, as storage units, a dynamic map storage 48, and an operation schedule storage 49.

The dynamic map storage 48 stores dynamic map data of the circuit 100 and a periphery thereof. The dynamic map is a three-dimensional map, and stores, for example, a position and a shape (three-dimensional shape) of the road (roadway and walkway). In addition, positions of a traffic lane, a crosswalk, a stop line, or the like drawn on the road are also stored in the dynamic map. In addition, a position and a shape (three-dimensional shape) of a building and constructions such as a signal light for vehicle are also stored in the dynamic map. The dynamic map data is provided from the operation management apparatus 10.

The operation schedule storage 49 stores an operation schedule of the vehicle C equipped with the storage. As described above, the operation schedule is updated once per lap at the operation schedule updating point Pu (refer to FIG. 1).

The vehicle C autonomously travels based on the data of the circuit 100 stored in the dynamic map storage 48. In the autonomous travel, the three-dimensional point group data of the peripheral environment of the vehicle C is acquired by the lidar unit 23. In addition, the image of the peripheral environment of the vehicle C is captured by the camera 22.

An object in the captured image captured by the camera 22 is analyzed by the scan data analyzer 40. For example, an object in the captured image is detected by known deep learning methods such as SSD (Single Shot Multibox Detector) and YOLO (You Only Look Once) using supervised learning, and attributes of the detected object (such as a stop ST, a passerby, a construction, or the like) are recognized.

In addition, the scan data analyzer 40 acquires the three-dimensional point group data (lidar data) from the lidar unit 23. By overlapping the captured image of the camera 22 and the lidar data, it becomes possible to determine what object of what attribute (a stop ST, a passerby, a construction, or the like) is positioned at what distance from the vehicle.

The self-position estimator 42 estimates a self position in the dynamic map based on a self position (latitude and longitude) received from the GPS receiver 26. The estimated self position is used for the path creation, and is also transmitted to the operation management apparatus 10 along with time information acquired from the clock 27.

The path creator 44 creates a path from the estimated self position to an immediately near target point. For example, a path from the self position to the stop ST is created. When it becomes certain that an obstacle exists on a straight-line path from the self position to the stop ST based on the three-dimensional point group data by the lidar unit 23 and the captured image by the camera 22, a path is created to avoid the obstacle.

The autonomous travel controller 46 executes travel control of the vehicle C based on the overlap data of the captured image and the lidar data, the self position, the path which is already created, and the operation schedule, determined as above. For example, a traveling velocity on the path which is already created is autonomously controlled to match with a target velocity V1 (to be described later) determined by the operation schedule. For example, the autonomous travel controller 46 controls the drive mechanism 28 such as an inverter, to maintain the velocity of the vehicle C at the target velocity V1. In addition, the autonomous travel controller 46 operates a wheel 31 through control of the steering mechanism 30 such as an actuator, to control the vehicle C to proceed on the determined path.

At the stop ST, the autonomous travel controller 46 opens a loading/unloading door (not shown) after stopping the vehicle C. In this process, the autonomous travel controller 46 refers to the clock 27, and maintains the vehicle C at a stopped state until a departure target time Td* (to be described later) determined by the operation schedule. After loading and unloading are completed and the time reaches the departure target time Td*, the autonomous travel controller 46 closes the loading/unloading door, and causes the vehicle C to start traveling.

Structure of Operation Management Apparatus

The operation management apparatus 10 manages the operations of the vehicles C which autonomously travel on the circuit 100. The operation management apparatus 10 is placed, for example, in a management company which manages the operations of the vehicles C. The operation management apparatus 10 is formed from, for example, a computer. FIG. 2 exemplifies a hardware structure of the operation management apparatus 10.

Similar to the hardware structure of the vehicle C, the operation management apparatus 10 comprises an input/output controller 10A, a CPU 10B, a GPU 10C, a DLA 10D, a ROM 10E, a RAM 10F, and a hard disk drive 10G (HDD). These constituting components are connected to an internal bus 10J.

The operation management apparatus 10 further comprises an inputter 10H such as a keyboard and a mouse, for inputting data as necessary. The operation management apparatus 10 further comprises a display 101 such as a display device for graphically displaying the operation schedule or the like. The inputter 10H and the display 101 are connected to the internal bus 10J.

FIG. 3 exemplifies functional blocks of the operation management apparatus 10. The operation management apparatus 10 includes, as storage units, an operation schedule storage 65 and a dynamic map storage 66. In addition, the operation management apparatus 10 includes, as functional units, a vehicle information acquisition unit 60, an operation schedule creator 62, an operation schedule provider 63, an operation route creator 64, and an introduction controller 68.

The operation route creator 64 creates a route on which the vehicle C is to travel, that is, the circuit 100. For example, a path is selected from a road which includes a branch, to create the circuit 100. Dynamic map data corresponding to the circuit 100 which is created is extracted from the dynamic map storage 66, and is transmitted to the vehicle C.

The operation schedule creator 62 creates an operation schedule to be provided to the operating vehicle C which is operating on the circuit 100. As will be described later, the operation schedule creator 62 can create a normal operation schedule, a substitute vehicle introduction operation schedule, and an advancement operation schedule. In addition, as will be described later, the operation schedule creator 62 can calculate an arrival target time Ta* and a departure target time Td* of each of the stops ST1~ST3 based on the created operation schedule and time information obtained from a clock 17.

The operation schedule provider 63 provides the operation schedule created by the operation schedule creator 62 to each of the operating vehicles C at the operation schedule updating point Pu (operation schedule updating location). As will be described later, the operation schedule provider 63 provides an operation schedule of one lap of the circuit 100 to the operating vehicle C passing the operation schedule updating point Pu.

The vehicle information acquisition unit 60 receives vehicle information from the operating vehicles C1~C4 and the inactive vehicles C5~C8. The vehicle information includes various information such as a current position, a number of passengers, an SOC of the battery, information of various devices acquired by a vehicle-mounted sensor, and the like. In addition, when a failure or the like occurs in the operating vehicles C1~C4, and operation becomes impossible, a non-operable notification is transmitted to the vehicle information acquisition unit 60. Further, for the inactive vehicles C5~C8, maintenance information such as a maintenance checkup is transmitted to the vehicle information acquisition unit 60.

The introduction controller 68 controls an introduction timing of the vehicle C to the circuit 100. In particular, when the non-operable vehicle to be described later occurs, the introduction controller 68 controls a timing when the substitute vehicle C is to be introduced to the circuit 100.

Normal Operation Schedule

The normal operation schedule is an operation schedule which is applied when the operating vehicles (vehicles C1~C4 in FIG. 1) which autonomously travel on the circuit 100 travel in a circuit while the number of the operating vehicles is maintained. In other words, the normal operation schedule is applied when the vehicles C travel one lap of the circuit 100 in a state without any increase or decrease in the number of vehicles.

For example, in the normal operation schedule, a stopping time at each of the stops ST1~ST3 is uniformly set for the vehicles C, and a target velocity V1 is also uniformly set for the vehicles C, so that operation intervals of the operating vehicles C traveling on the circuit 100 are an equal interval to each other.

The target velocity V1 and the stopping time at each of the stops ST1~ST3 which are set in the normal operation schedule are also herein referred to as normal value(s) From this viewpoint, the normal operation schedule may also be considered as an operation schedule formed using the normal value(s). The normal operation schedule is determined by the operation schedule creator 62 of the operation management apparatus 10 in advance, for example, before the operation is actually executed with the operation schedule.

Figure 4:
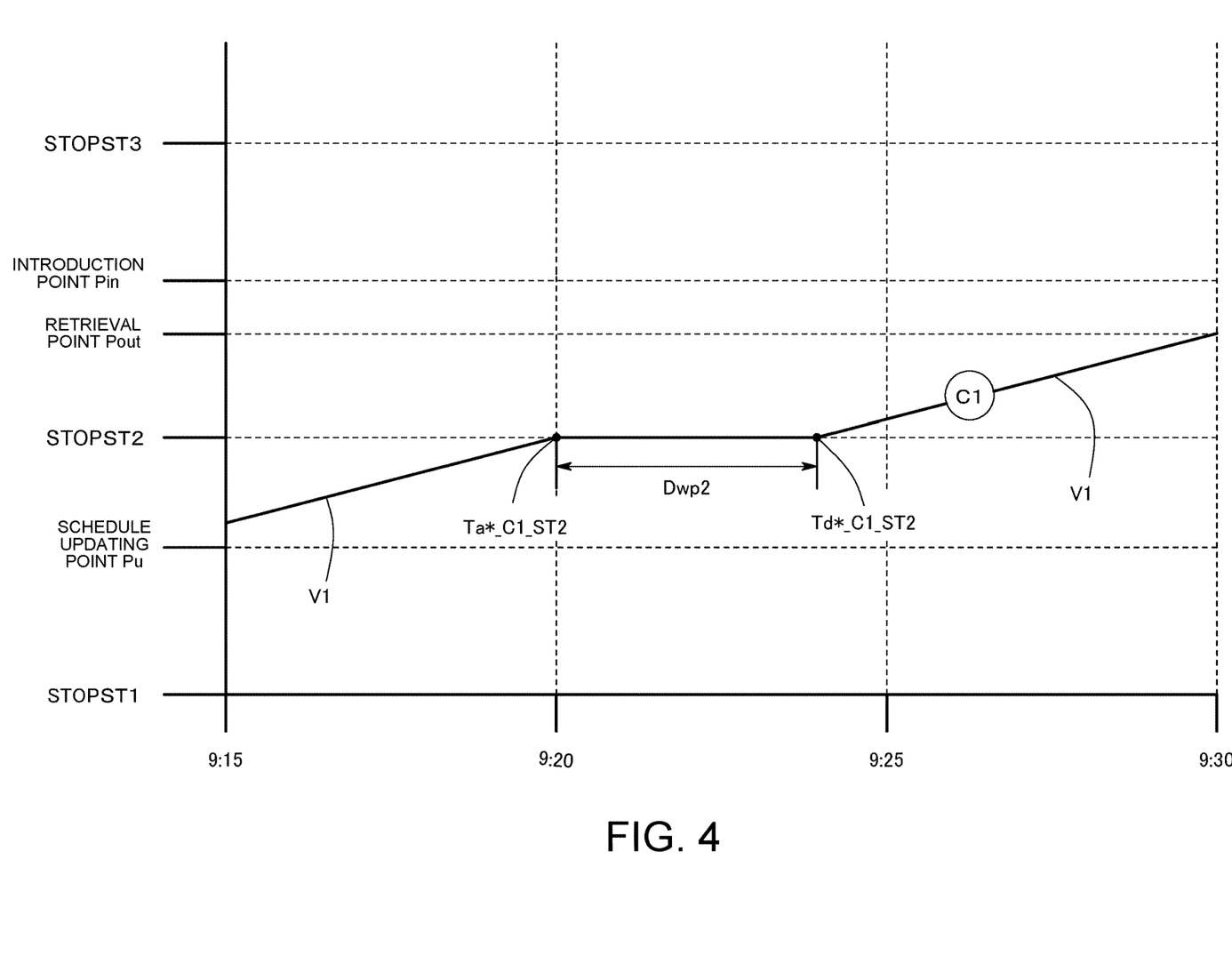
FIG. 4 is an explanatory diagram of terms used in an operation schedule creation.

FIG. 4 exemplifies a diagram showing a part of an operation schedule of the operating vehicle C1. In the following description, in the diagram, a horizontal axis shows time, and a vertical axis shows various locations on the circuit 100 including the stops ST1~ST3, the operation schedule updating point Pu, the retrieval point Pout, and the introduction point Pin.

In creation of the operation schedule, a target velocity and a planned stopping time of the operating vehicle C1 are determined. In the normal operation schedule, the target velocity is uniformly set to a velocity V1. In addition, a planned stopping time Dwp1 at the stop ST1 (refer to FIG. 5), a planned stopping time Dwp2 at the stop ST2, and a planned stopping time Dwp3 at the stop ST3 (refer to FIG. 5) are also uniformly set for all of the operating vehicles C1~C4.

Based on the target velocity V1 and the planned stopping times Dwp1, Dwp2, and Dwp3, times for passing various locations on the circuit 100 are determined. For example, a time of passing the operation schedule updating point Pu is acquired from the clock 17 (refer to FIG. 2). In addition, for example, as exemplified in FIG. 4, an arrival time to the stop ST2 (arrival target time Ta*_C1_ST2) when the operating vehicle C1 is traveled at the target velocity V1 from the operation schedule updating point Pu is determined. In addition, a departure time from the stop ST2 (departure target time Td*_C1_ST2) after stopping the operating vehicle C1 over the planned stopping time Dwp2 from the arrival time is determined.

Figure 5:
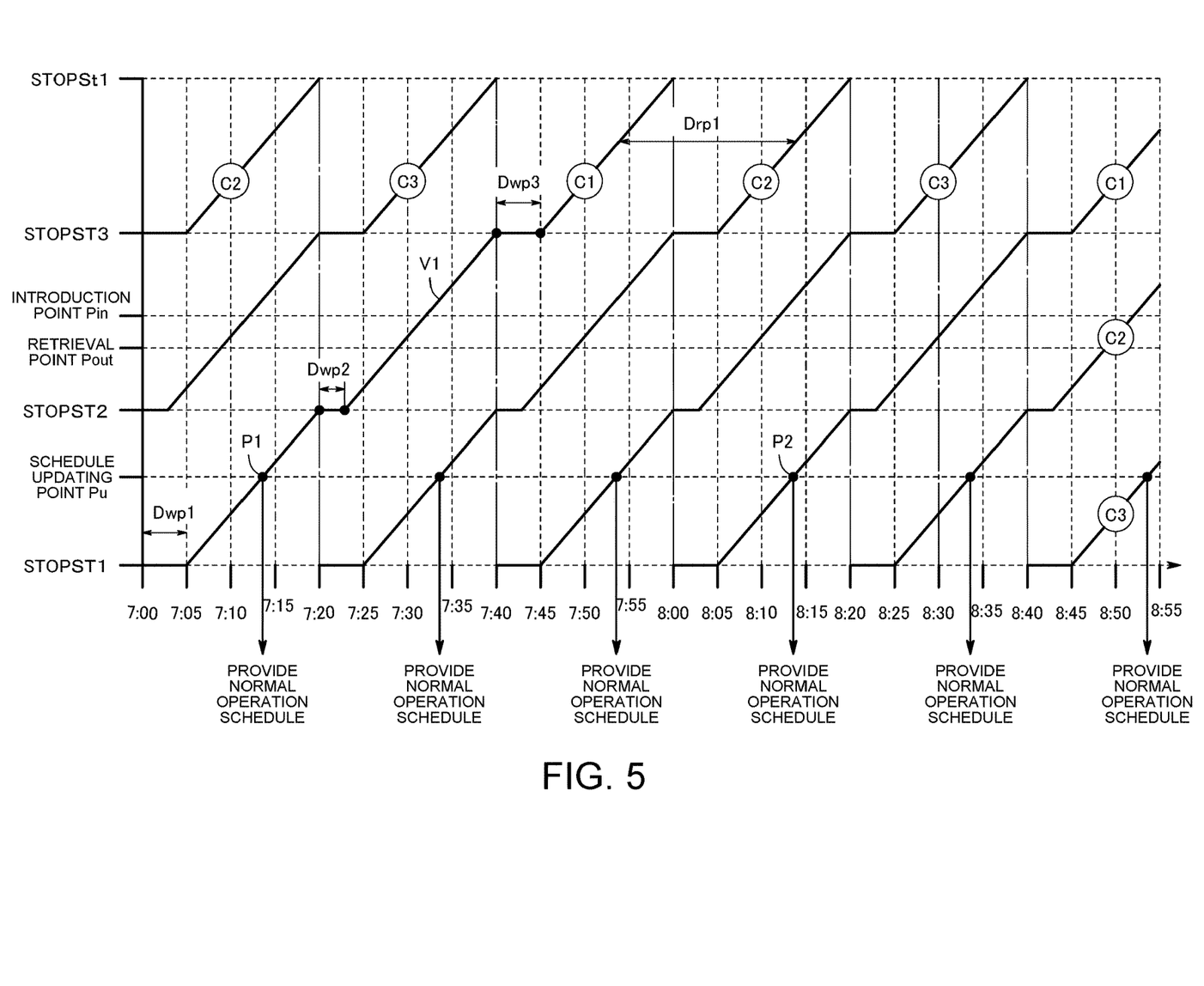
FIG. 5 shows a diagram exemplifying a normal operation schedule, operated with a number of vehicles of 3 and an interval of 20 minutes.
Figure 6:
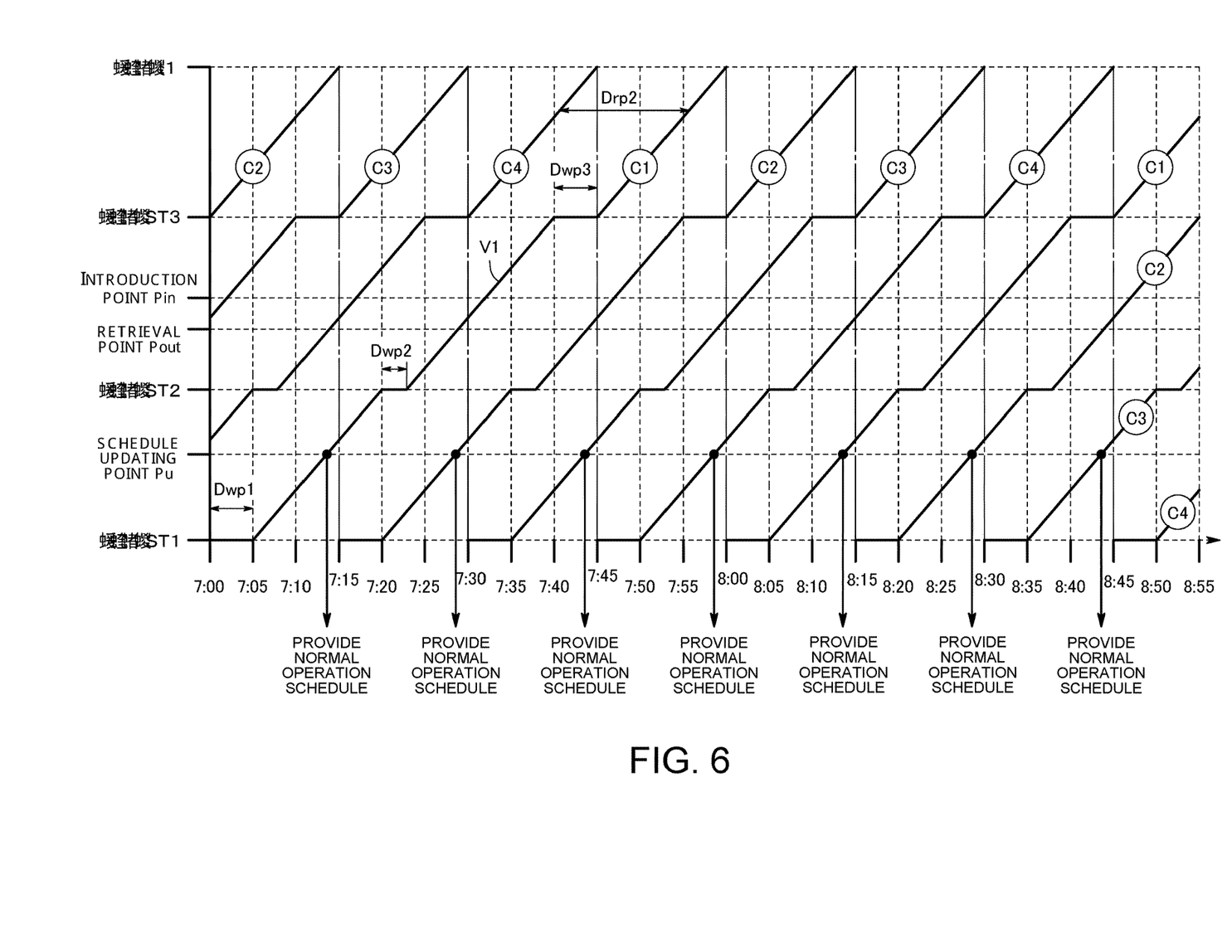
FIG. 6 shows a diagram exemplifying a normal operation schedule, operated with a number of vehicles of 4 and an interval of 15 minutes.

FIGS. 5 and 6 exemplify diagrams according to normal operation schedules having different operation configurations. FIG. 5 exemplifies a normal operation diagram of an operation with a number of vehicles of 3 and an interval of 20 minutes. In this example configuration, a target velocity V1 which is a normal value is uniformly set for all of the operating vehicles C1~C3. In addition, the planned stopping times Dwp at the stops ST1, ST2, and ST3 are uniformly set to planned stopping times Dwp1, Dwp2, and Dwp3 which are normal values. Further, a planned operation interval Drp1 is set to 20 minutes.

FIG. 6 exemplifies a normal operation diagram of an operation with a number of vehicles of 4 and an interval of 15 minutes. Also in this example configuration, the target velocity V1 which is the normal value is uniformly set for all of the operating vehicles C1 C4. In addition, the planned stopping times Dwp at the stops ST1, ST2, and ST3 are uniformly set to the planned stopping times Dwp1, Dwp2, and Dwp3 which are the normal values. Further, the planned operation interval Drp2 is set to 15 minutes.

For example, when the operation configuration on the circuit 100 is the configuration as shown in FIG. 6 with the number of vehicles of 4 and the interval of 15 minutes, the operation schedule provider 63 (FIG. 3) provides, at the operation schedule updating point Pu (operation schedule updating location), the operation schedule to each of the operating vehicles C1~C4, passing the updating point. In this case, the operation schedule provider 63 provides one lap of the operation schedule to each of the operating vehicles C1~C4 passing the operation schedule updating point Pu.

For example, when the operating vehicle C1 passes the operation schedule updating point Pu, the operation schedule data of the operating vehicle C1 is provided to the operating vehicle C1 from the point Pu, the operation schedule data including data until the operating vehicle C1 next passes the operation schedule updating point Pu (for example, from a point P1 to a point P2 in FIG. 5).

In this case, the operation schedule data provided to an operating vehicle Ck (k=1~4 when the number of vehicles is 4) includes the arrival target times Ta*_Ck_ST1~Ta*_Ck_ST3 to the stops ST1~ST3, and the departure target times Td*_Ck_ST1~Td*_Ck_ST3 from the stops ST1~ST3. Further, the operation schedule data provided to the operating vehicle Ck includes the planned stopping times Dwp1, Dwp2, and Dpw3 at the stops ST1~ST3, and the target velocity V1.

Control Upon Occurrence of Non-Operable Vehicle

Figure 7:
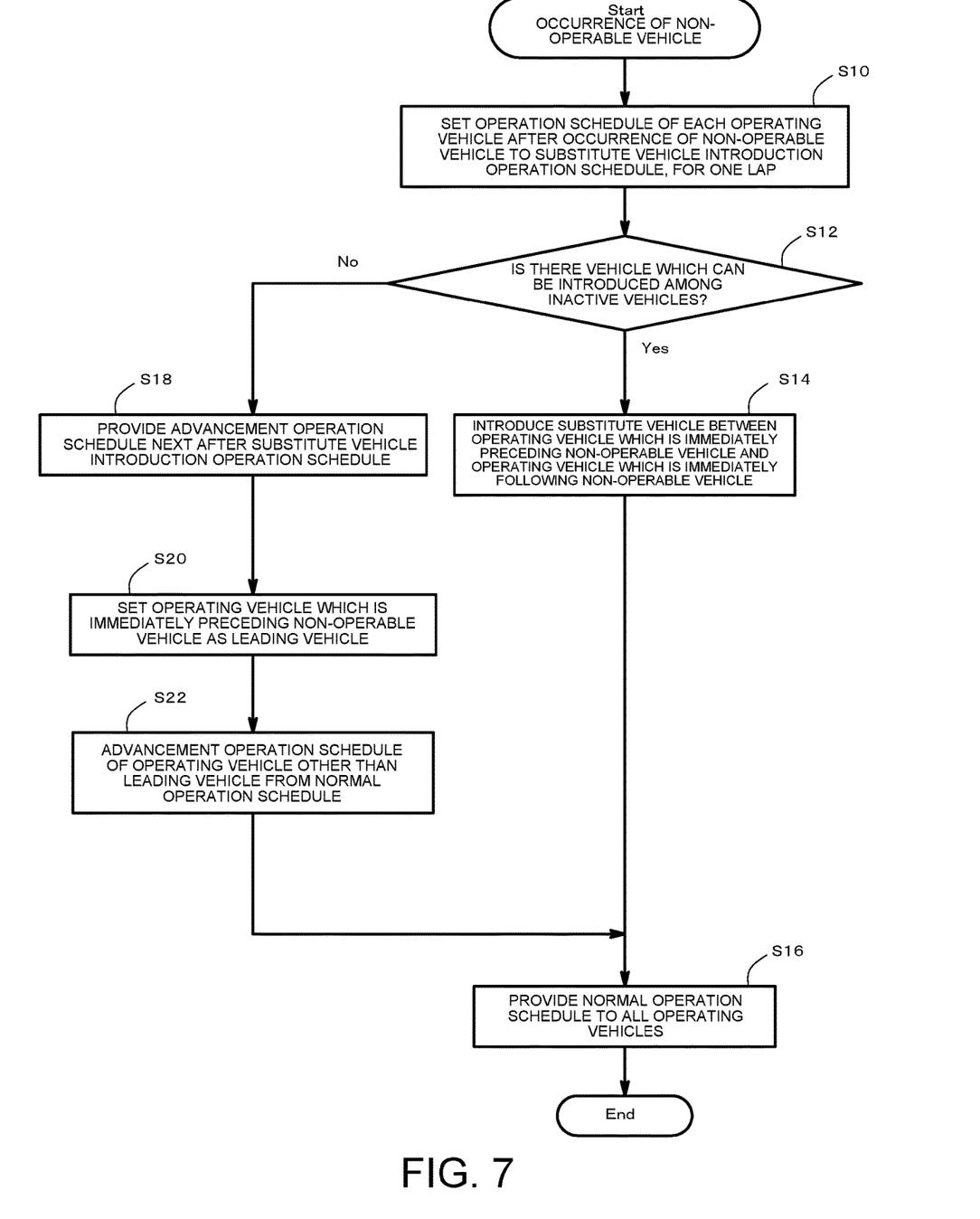
FIG. 7 is a flowchart exemplifying control upon occurrence of a non-operable vehicle.

FIG. 7 exemplifies an operation control flow when a non-operable vehicle occurs among the operating vehicles C. When the autonomous travel of the operating vehicle C becomes impossible such as, for example, should the camera 22 be damaged by a projectile or the like during travel of the operating vehicle C, a non-operable notification is output from the controller 20 (refer to FIG. 3) to the vehicle information acquisition unit 60.

In response, the vehicle information acquisition unit 60, the operation schedule creator 62, the operation schedule provider 63, and the introduction controller 68 execute control upon occurrence of a non-operable vehicle exemplified in a flowchart of FIG. 7.

In this control, when a substitute vehicle replacing the non-operable vehicle can be quickly arranged after the non-operable vehicle occurs, an operation interval (inter-vehicle space) is secured for the substitute vehicle, so that the substitute vehicle can be reliably introduced. On the other hand, when the arrangement of the substitute vehicle is not possible, the operation intervals are rearranged in order to execute an equal-interval operation by the remaining operating vehicles C.

The vehicle information acquisition unit 60 receiving the non-operable notification causes the operation schedule creator 62 to create a substitute vehicle introduction operation schedule for all of the operating vehicles other than a non-operable vehicle which has output the non-operable notification (S10).

The substitute vehicle introduction operation schedule is an operation schedule which is provided to each of the operating vehicles C when the operating vehicle C passes the operation schedule updating point Pu for a first time after the non-operable notification is output. For example, the substitute vehicle introduction operation schedule is created for one lap of the circuit 100.

Figure 8:
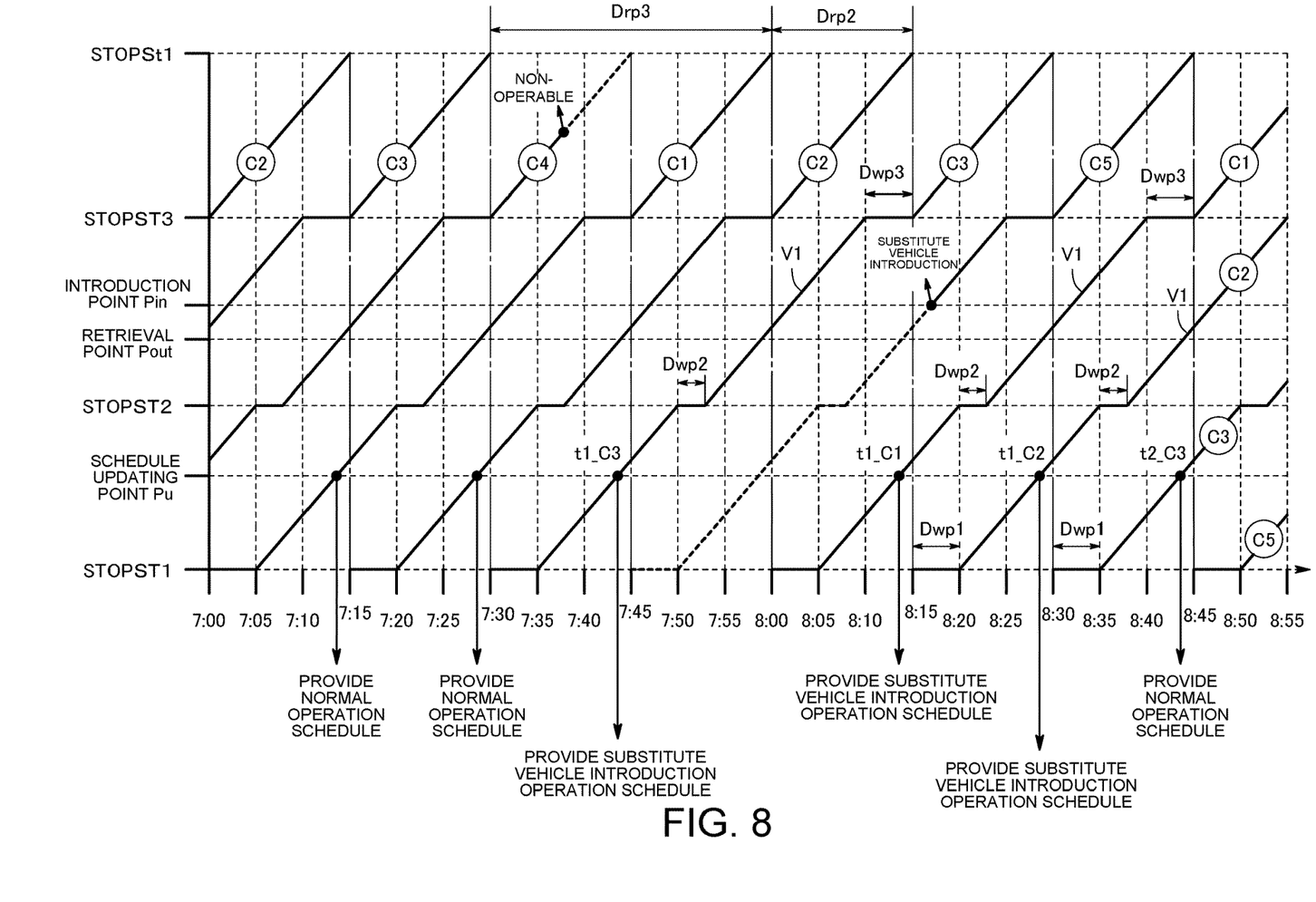
FIG. 8 shows a diagram when a substitute vehicle is introduced.

As exemplified in FIG. 8, for example, the operating vehicle C3 passes the operation schedule updating point Pu at a time t1_C3 after the non-operable notification is output from a non-operable vehicle C4. At this point, the substitute vehicle introduction operation schedule is provided. Similarly, the substitute vehicle introduction operation schedule is provided to the operating vehicle C1 at a time t1_C1, and to the operating vehicle C2 at a time t1_C2.

The substitute vehicle introduction operation schedule is created based on the planned stopping times Dwp1, Dwp2, and Dwp3, and the target velocity V1 determined by the normal operation schedule. Here, during the period indicated by the broken line of FIG. 8, because the non-operable vehicle C4 cannot travel after the non-operable notification is output, a planned operation interval Drp3 between the operating vehicle C3 and the operating vehicle C1 before and after the non-operable vehicle C4 becomes twice a planned operation interval Drp2 between the other operating vehicles. The planned operation interval Drp3 which is relatively wide is used for introduction of the substitute vehicle.

The vehicle information acquisition unit 60 judges, based on vehicle information of the inactive vehicles C5~C8 which are waiting in the shed 110 (FIG. 1), whether or not a substitute vehicle can be chosen from these vehicles (S12). For example, the vehicle information acquisition unit 60 refers to the SOCs of the batteries of the inactive vehicles C5~C8, and selects inactive vehicles C5~C8 having a state-of-charge which allows an operation of a plurality of laps on the circuit 100. The vehicle information acquisition unit 60 further refers to maintenance checkup information of the selected inactive vehicles C5~C8, and selects inactive vehicles C5~C8 which are not the target of the maintenance checkup such as component exchange. An inactive vehicle selected in this manner is selected as the substitute vehicle. In the example configuration of FIG. 1, the inactive vehicle C5 is selected as the substitute vehicle.

When the substitute vehicle C5 is selected, the vehicle information acquisition unit 60 provides information of the substitute vehicle C5 to the introduction controller 68 and the operation schedule creator 62. The operation schedule creator 62 creates, as an operation schedule of the substitute vehicle, an operation schedule from the introduction point Pin to the operation schedule updating point Pu based on the normal values; that is, based on the target velocity V1 and planned stopping times Dwp1 and Dwp3. The created operation schedule is provided to the substitute vehicle C5 through the operation schedule provider 63.

The introduction controller 68 instructs the substitute vehicle C5 of the introduction timing from the introduction point Pin to the circuit 100. More specifically, the introduction controller 68 causes the substitute vehicle C5 to be introduced between the operating vehicle C3 which is the vehicle immediately preceding the non-operable vehicle C4 and the operating vehicle C1 which is the vehicle immediately following the non-operable vehicle C4 (S14).

For example, the introduction controller 68 acquires a time when the operating vehicle C3 passes the introduction point Pin (around 8:02) based on the substitute vehicle introduction operation schedule. Similarly, the introduction controller 68 acquires a time when the operating vehicle C1 passes the introduction point Pin (around 8:32) based on the substitute vehicle introduction operation schedule. Then, the introduction controller 68 sets an introduction time of the substitute vehicle C5 to the circuit 100 at an introduction time which is a midpoint of the above-described two times (around 8:17), and transmits the set introduction time to the substitute vehicle C5.

The substitute vehicle C5 waits in the shed 110 until the introduction time is reached, and enters the circuit 100 from the introduction point Pin when the introduction time is reached. From this time on, the substitute vehicle C5 travels in the circuit 100 based on the operation schedule provided from the operation schedule provider 63. Then, when the substitute vehicle C5 passes the operation schedule updating point Pu, the normal operation schedule is provided (S16). Further, the normal operation schedule is provided next after the substitute vehicle introduction operation schedule to the other operating vehicles C1~C3 after the other operating vehicles have traveled the circuit 100 for a predetermined number of laps (for example, one lap) based on the substitute vehicle introduction operation schedule.

Referring back to step S12 of FIG. 7, when the vehicle information acquisition unit 60 judges that the substitute vehicle cannot be chosen from the inactive vehicles C5~C8, the vehicle information acquisition unit 60 switches the normal operation schedule from the equal-interval operation with a number of vehicles of 4 including the non-operable vehicle C4 and an interval of 15 minutes to an equal-interval operation with a number of vehicles of 3, including the operating vehicles C1~C3, and an interval of 20 minutes.

For the switching from the 4-vehicle, 15-minutes-interval operation to the 3-vehicle, 20-minutes-interval operation, the vehicle information acquisition unit 60 instructs the operation schedule creator 62 to create an advancement operation schedule. The created advancement operation schedule is provided to each of the operating vehicles C1~C3 next after the substitute vehicle introduction operation schedule (S18). For example, when the substitute vehicle introduction operation schedule is a schedule for only one lap, the advancement operation schedule is provided to each of the operating vehicles C1~C3 at a second lap after the occurrence of the non-operable vehicle; that is, when the operating vehicle passes the operation schedule updating point Pu for a second time after the occurrence of the non-operable vehicle.

As shown in the example of FIG. 8, in the advancement operation schedule, of the operating vehicles C1~C3, the operating vehicle C3 which immediately precedes the non-operable vehicle C4 is set as a leading vehicle (S20), and the operation schedule of each of the operating vehicles C1 and C2 which follow the leading vehicle is advanced from the normal operation schedule (S22).

Figure 9:
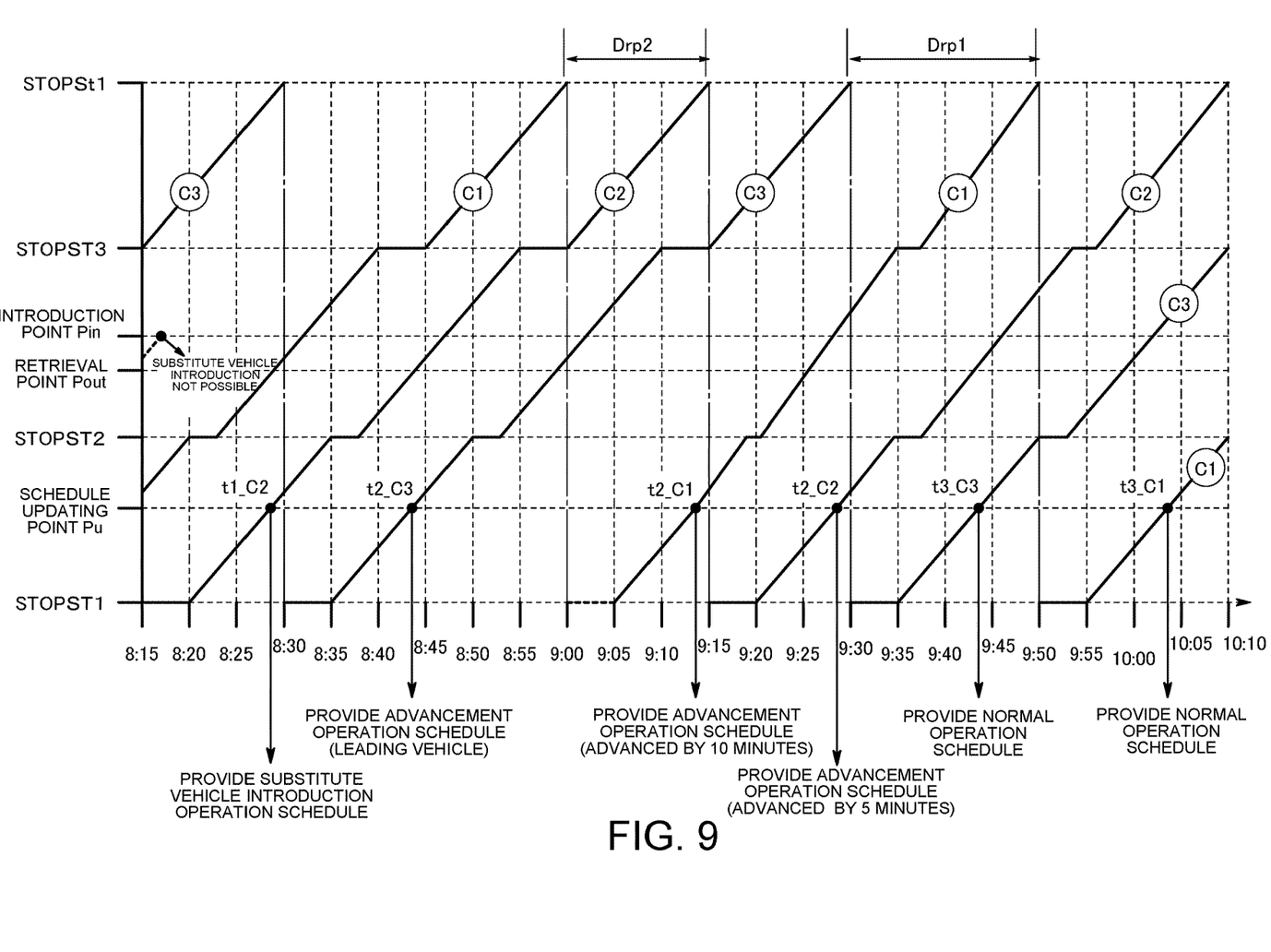
FIG. 9 shows a diagram which exemplifies an operation situation by an advancement operation schedule.

As exemplified in FIG. 9, the advancement operation schedule is provided, as the leading vehicle, to the operating vehicle C3 which has traveled one lap of the circuit 100 based on the substitute vehicle introduction operation schedule. The leading vehicle is a vehicle which becomes a reference for advancement, and an operation schedule based on the normal value is provided. That is, an operation schedule based on the target velocity V1, and the planned stopping times Dwp1, Dwp2, and Dwp3 is provided.

Next, the planned operation interval between the operating vehicle C1 which immediately follows the non-operable vehicle C4 and the leading vehicle C3 is changed from Drp3 (refer to FIG. 8; 30 minutes) to Drp 1 (refer to FIG. 9; 20 minutes). Thus, the operation schedule of the operating vehicle C1 is advanced by 10 minutes in comparison to the normal operation schedule.

Figure 10:
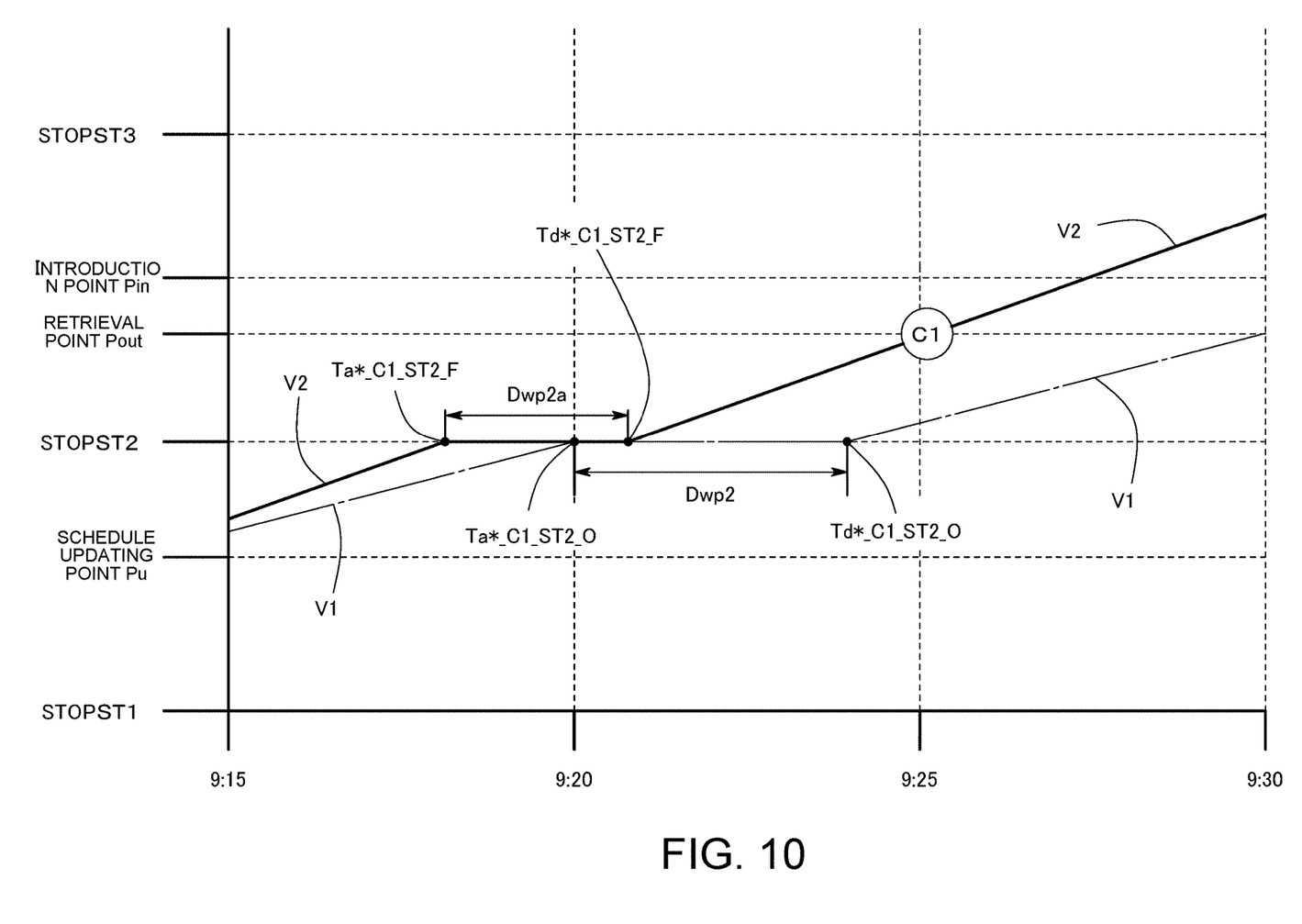
FIG. 10 is a partial enlarged view of a diagram which exemplifies an advancement process.

FIG. 10 shows an example of the advancement of the schedule for the operating vehicle C1. For example, a target velocity V2 faster than the target velocity V1 is set. In addition, a planned stopping time Dwp2a shorter than the planned stopping time Dwp2 is set. As a result, a departure target time Td*C1_ST2_F from the stop ST2 is shortened by about 3 minutes from the departure target time Td*C1_ST2_0 based on the normal operation schedule. Such advancement is applied for one lap, so that he the planned operation interval between the operating vehicle C3 and the operating vehicle C1 is shortened from Drp3 to Drp1.

For the operating vehicle C1 and the operating vehicle C2 following the operating vehicle C1, the planned operation interval is changed from the planned operation interval Drp2 (15 minutes) determined by the substitute vehicle introduction operation schedule to the planned operation interval Drp1 (20 minutes) determined by the advancement operation schedule.

As described above, the schedule of the operating vehicle C1 is advanced by 10 minutes. Therefore, the operating interval between the operating vehicle C1 and the operating vehicle C2 at this point is 25 minutes, obtained by adding the planned operation interval Drp2 (15 minutes) to the advanced 10 minutes. In order to shorten this time to the planned operation interval Drp1 (20 minutes), the schedule of the operating vehicle C2 is advanced by 5 minutes from the normal operation schedule. This advancement is realized, as described above, by executing at least one of an increase of the target velocity or a shortening of the stopping time from the normal operation schedule.

With the provision of the advancement operation schedule to the operating vehicles C1~C3, the operating vehicles C1~C3 are operated in the 3-vehicles, 20-minutes configuration as exemplified in FIG. 5. After the operation by the advancement operation schedule is executed for a predetermined number of laps (for example, one lap), the operation based on the normal operation schedule is executed (S16).

Alternative Configuration of Schedule Change

In the above-described embodiment, the application of the substitute vehicle introduction operation schedule and the advancement operation schedule is completed within one lap of the circuit 100, but the operation management apparatus of the present disclosure is not limited to such a configuration. For example, the substitute vehicle introduction operation schedule and the advancement operation schedule may be applied for a plurality of laps. For example, after the substitute vehicle introduction operation schedule is provided to the operating vehicles for a plurality of laps, the advancement operation schedule may be provided to the operating vehicles for a plurality of laps.

The present disclosure is not limited to the present embodiments described above, and includes all changes and modifications without departing from the technical scope or the essence of the present disclosure defined by the claims.

The invention claimed is:

1. An operation management apparatus of a plurality of autonomous travel vehicles which autonomously travel on a circuit, the operation management apparatus comprising:
one or more processors programmed to act as:
an operation schedule creator that creates an operation schedule for each of a plurality of operating vehicles which are autonomously traveling on the circuit; and
an operation schedule provider that provides the operation schedule of one lap for each of the operating vehicles when the operating vehicle passes an operation schedule updating location provided on the circuit, wherein:
the operation schedule creator creates, as the operation schedule, a normal operation schedule in which a stopping time at a stop provided along the circuit and a target velocity of each of the operating vehicles are determined so that operation intervals of the plurality of operating vehicles are an equal interval to each other;
when a non-operable notification is output from any of the plurality of operating vehicles, the operation schedule creator creates a substitute vehicle introduction operation schedule for one lap based on the stopping time and the target velocity determined by the normal operation schedule, as the operation schedule to be provided, to each of the operating vehicles other than a non-operable vehicle which has output the non-operable notification, when the operating vehicle passes the operation schedule updating location for a first time after the non-operable notification is output;
the operation schedule creator creates, based on the stopping time and the target velocity determined in the normal operation schedule, the substitute vehicle introduction operation schedule in which an operation interval between one of the plurality of operating vehicles that is immediately preceding the non-operable vehicle and another one of the plurality of operating vehicles that is immediately following the non-operable vehicle is defined to become twice an operation interval between other operating vehicles; and
the one or more processors of the operation management apparatus are further programmed to act as:
a vehicle information acquisition unit that receives vehicle information from the plurality of operating vehicles and an inactive vehicle which is the autonomous travel vehicle for which an operation is suspended; and
an introduction controller that controls an introduction timing of the autonomous travel vehicle to the circuit, wherein:
when the vehicle information acquisition unit receives the non-operable notification, the vehicle information acquisition unit judges whether or not a substitute vehicle which be introduced to the circuit can be chosen from the inactive vehicle while the operating vehicles other than the non-operable vehicle travel one lap of the circuit based on the substitute vehicle introduction operation schedule,
when the vehicle information acquisition unit judges that the substitute vehicle can be chosen, the introduction controller causes the substitute vehicle to be introduced between an operating vehicle which is immediately preceding the non-operable vehicle and an operating vehicle which is immediately following the non-operable vehicle, while the plurality of operating vehicles are traveling on the circuit based on the substitute vehicle introduction operation schedule, and
when the vehicle information acquisition unit judges that the substitute vehicle cannot be chosen, the vehicle information acquisition unit instructs the operation schedule creator to create an advancement operation schedule different from either the normal operation schedule or the substitute vehicle introduction operation schedule, and the operation schedule provider provides the advancement operation schedule to each of the operating vehicles other than the non-operable vehicle when the operating vehicle passes the operation schedule updating location for a second time after the non-operable notification is output.

2. The operation management apparatus of the plurality of autonomous travel vehicles according to claim 1, wherein
in the advancement operation schedule, the operating vehicle which is immediately preceding the non-operable vehicle is set as a leading vehicle, and the operation schedule of each of the operating vehicles which follow the leading vehicle is advanced from the normal operation schedule.

3. The operation management apparatus of the plurality of autonomous travel vehicles according to claim 1, wherein
the operation schedule updating location is provided on the circuit such that the operation schedule is updated every time the operating vehicle passes the operation schedule updating location on the circuit, for a single lap of the circuit.

4. An operation management method of a plurality of autonomous travel vehicles which autonomously travel on a circuit, the method comprising:
creating an operation schedule for each of a plurality of operating vehicles which are autonomously traveling on the circuit;
providing the operation schedule of one lap for each of the operating vehicles when the operating vehicle passes an operation schedule updating location provided on the circuit;
creating, as the operation schedule, a normal operation schedule in which a stopping time at a stop provided along the circuit and a target velocity of each of the operating vehicles are determined so that operation intervals of the plurality of operating vehicles are an equal interval to each other;
creating, when a non-operable notification is output from any of the plurality of operating vehicles, a substitute vehicle introduction operation schedule for one lap based on the stopping time and the target velocity determined by the normal operation schedule, as the operation schedule to be provided, to each of the operating vehicles other than a non-operable vehicle which has output the non-operable notification, when the operating vehicle passes the operation schedule updating location for a first time after the non-operable notification is output, wherein the substitute vehicle introduction operation schedule is determined, based on the stopping time and the target velocity determined in the normal operation schedule, in such a manner that an operation interval between one of the plurality of operating vehicles that is immediately preceding the non-operable vehicle and another one of the plurality of operating vehicles that is immediately following the non-operable vehicle is defined to become twice an operation interval between other operating vehicles;

receiving vehicle information from the plurality of operating vehicles and an inactive vehicle which is the autonomous travel vehicle for which an operation is suspended;

judging, upon reception of the non-operable notification, whether or not a substitute vehicle which can be introduced to the circuit can be chosen from the inactive vehicle while the operating vehicles other than the non-operable vehicle travel one lap of the circuit based on the substitute vehicle introduction operation schedule;

causing, when it is judged that the substitute vehicle can be chosen, the substitute vehicle to be introduced between an operating vehicle which is immediately preceding the non-operable vehicle and an operating vehicle which is immediately following the non-operable vehicle, while the plurality of operating vehicles are traveling on the circuit based on the substitute vehicle introduction operation schedule; and creating, when is it judged that the substitute vehicle cannot be chosen, an advancement operation schedule different from either the normal operation schedule or the substitute vehicle introduction operation schedule, and providing the advancement operation schedule to each of the operating vehicles other than the non-operable vehicle when the operating vehicle passes the operation schedule updating location for a second time after the non-operable notification is output.

5. The operation management method of the plurality of autonomous travel vehicles according to claim 4, wherein in the advancement operation schedule, the operating vehicle which is immediately preceding the non-operable vehicle is set as a leading vehicle, and the operation schedule of each of the operating vehicles which follow the leading vehicle is advanced from the normal operation schedule.

* * * * *